March 14, 1961 S. KASWAN 2,974,921
PRESSURIZED POWER ACTUATED BUTTERFLY VALVE
Filed Feb. 9, 1959
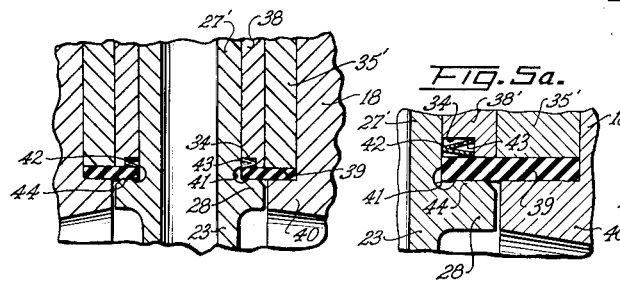
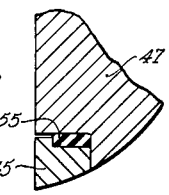
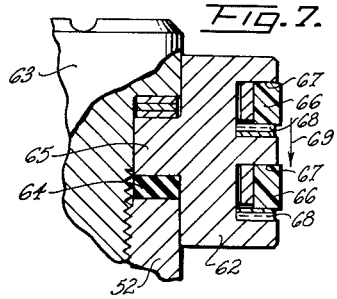
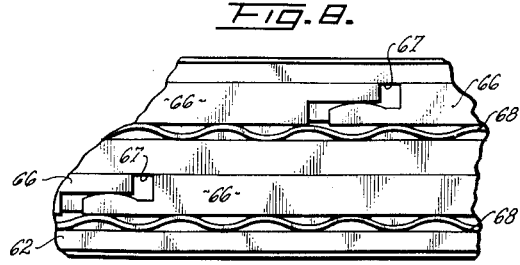
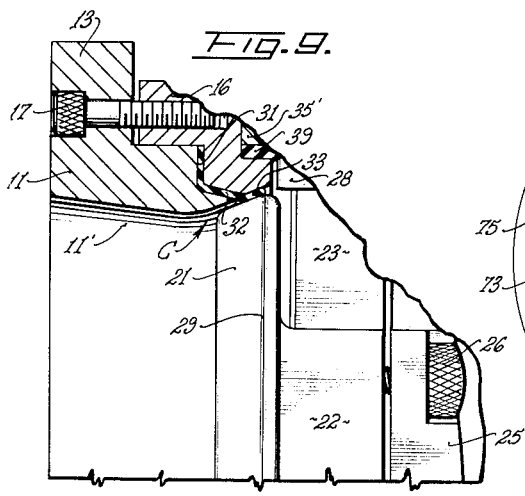
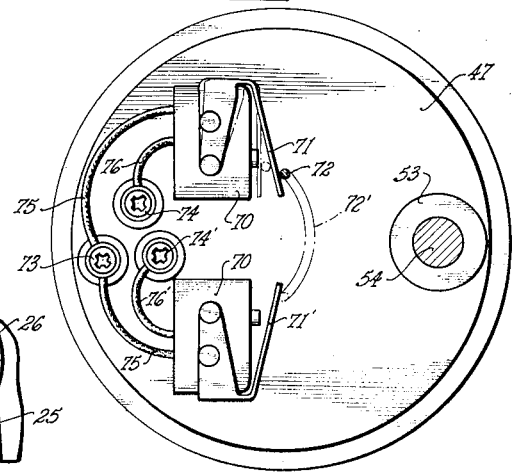
INVENTOR.
SIEGFRIED KASWAN
BY
ATTORNEYS

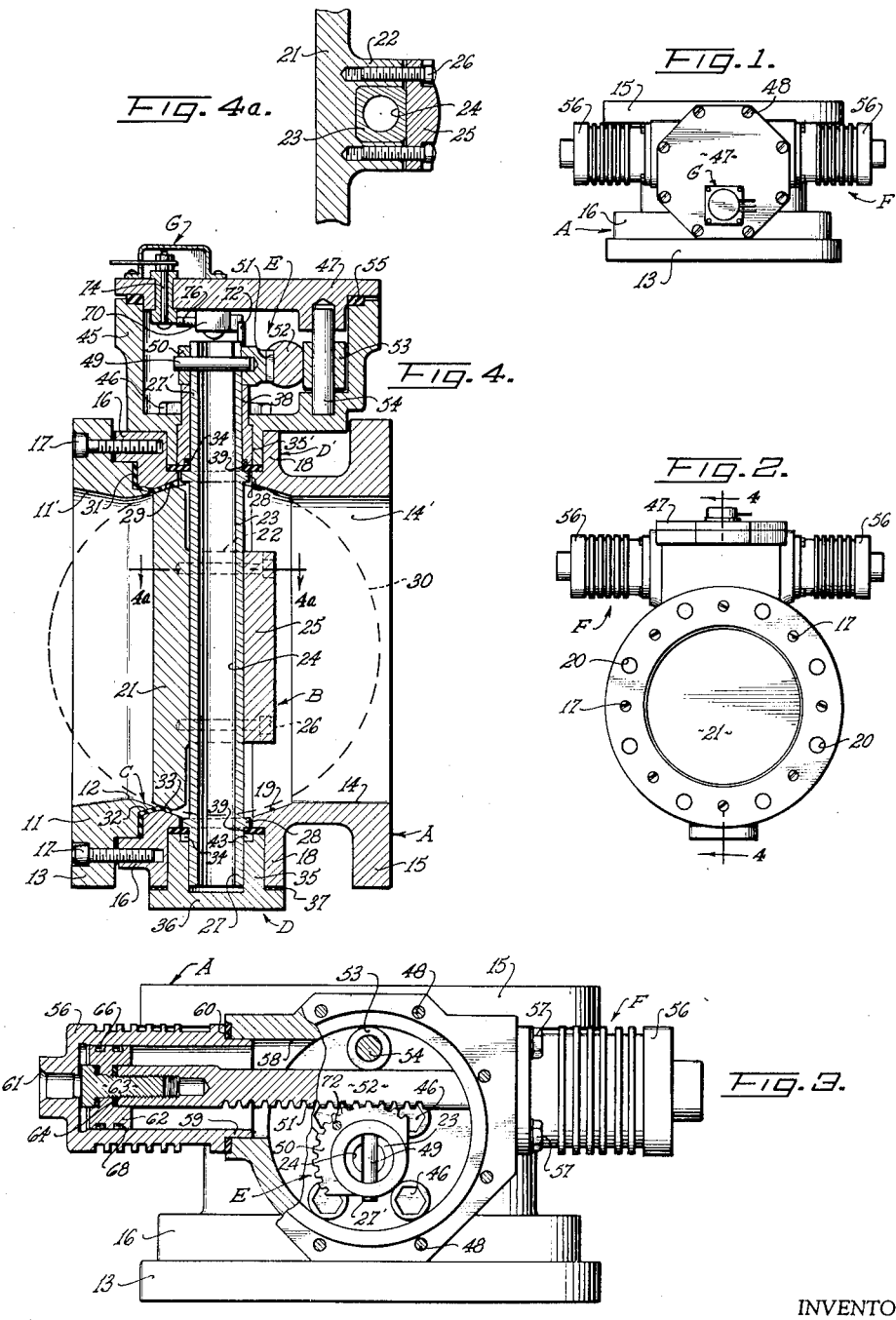

United States Patent Office 2,974,921
Patented Mar. 14, 1961

2,974,921

PRESSURIZED POWER ACTUATED BUTTERFLY VALVE

Siegfried Kaswan, Sunland, Calif., assignor to Actuation Research Corporation, Glendale, Calif., a corporation of California Filed Feb. 9, 1959, Ser. No. 791,927

16 Claims. (Cl. 251—58)

This invention relates to power-operated shut-off valves of the butterfly type having fluid pressure actuation for opening and closing the same. The general object of the invention is to provide such a valve having improved dependability and performance characteristics, especially suitable for high requirement low temperature use as for example in controlling the flow of liquid oxygen in the fueling of rockets powered by liquid fuel.

The primary object of the invention is to provide a valve that will operate in a manner to exclude from its shaft, bearings and operating mechanism, moisture that would freeze and impair or stop operation of the valve when subjected to sub-freezing temperatures. To this end, the invention provides an arrangement wherein such operating parts are pressurized by a dry inert gas which prevents the entrance of moisture. More specifically, this is accomplished by utilizing a dry inert gas to power a fluid motor which is the actuator for the valve, and providing for a limited bleed of such dry gas into a casing enclosing the bearings of the butterfly shaft and gearing through which movement is transmitted to the shaft from the actuator, thereby effectively preventing the entry of moisture into contact with any of the functioning parts of the actuator, the gearing or the bearings.

A further object is to prevent leakage, from the valve flow-passage, of the fluid flowing therethrough. To attain this end, the hydraulic pressure in the actuator and the gearing and bearing chambers is maintained at a pressure level above that in the flow passage.

The bleed of gas from the actuator into the gear casing is provided for by utilizing an improved double acting hydraulic actuator embodying pistons which are sealed within respective cylinders by spring loaded piston rings, so arranged as to provide a uni-directional seal which affords one-way passage of pressure fluid for pressurization of the space between the pistons when pressure is applied to either of two actuator ports communicating with the remote ends of the respective pistons. A further object of the invention is to provide such a valve wherein the respective ends of the butterfly shaft are balanced and effectively sealed by fluid pressure balancing and sealing, a tubular shaft being utilized to balance the fluid pressures. The tubular shaft provides a passage for the operating gas pressure to act equally on both shaft seals and both ends of the shaft thus balancing the mechanism axially for proper alignment between butterfly and its seal for all operating conditions.

Further, the invention contemplates a symmetrical bearing and shaft seal arrangement providing for continued alignment of the butterfly and its seal as the dimensions of the parts change with changes in temperatures. The shaft seals are both pressure and spring loaded against shoulders on the shaft and provide positive sealing for all conditions of temperature although the coefficients of thermal expansions of the valve body and butterfly shaft are considerably different.

A further object of the invention is to avoid the necessity for utilizing a complex mounting and movement of the butterfly in approaching and receding from its seat, and to make it possible to operate the butterfly with a simple rotary movement on a fixed axis.

The invention provides an improved hydraulic pressure energized yielding valve seat in a butterfly valve having a butterfly disc that is rotatable on a single fixed axis, and has sliding engagement with the valve seat on a spherical surface in moving between a closed position and a slightly opened position.

A further object is to provide such a valve wherein the seal functions not only as a valve seat but also as a gasket to seal the joint between the sections of the valve housing assembly.

A still further object is to provide such a valve and actuator arrangement, utilizing a rack and gear segment for converting linear actuator movement to rotary butterfly movement, and wherein limit positions are indicated by switches which are mounted in a pressurized gear box for actuation by oscillating movements of the gear segments.

In this respect the invention contemplates a butterfly type valve having a butterfly valve disc which has a seating rim of spherical zone shape on a radius at the center of a supporting shaft upon which the butterfly is rotated between open and closed positions. A further object of the invention is to avoid leakage past the valve seat in the closed position, and to this end, the invention provides a valve wherein there will be no abrasive metal-to-metal drag between the butterfly and the valve seat during opening and closing movements. Accordingly, the invention provides an improved seat defined by a pressure loaded seal of collar form, of medium soft, flexible, highly abrasive resistant synthetic resin plastic material.

Other objects and advantages will become apparent in the ensuing specification and appended drawing in which:

Fig. 1 is a plan view of a valve embodying our invention;

Fig. 2 is an end view of the same;

Fig. 3 is a break-away end view with one actuator unit shown in section and the gear housing cover removed;

Fig. 4 is an axial sectional view of the valve unit taken on the line 4—4 of Fig. 2;

Fig. 4a is a detail axial sectional view normal to Fig. 4, taken on line 4a—4a of Fig. 4;

Figs. 5 and 5a are enlarged detail sectional views of one of the shaft seals;

Fig. 6 is a detail sectional view of the gear casing cover seal;

Fig. 7 is a detail fragmentary sectional view showing the actuator piston-cylinder seal;

Fig. 8 is a fragmentary detail side view on a circumferential surface, showing the piston seal;

Fig. 9 is a detail fragmentary sectional view showing the valve seat and valve housing gasket arrangement; and Fig. 10 is a plan view of the valve position indicator switch arrangement.

Referring now to the drawings in detail, and in particular to Figs. 3 and 4, we have shown therein, as an example of one form in which our invention may be embodied, a hydraulically actuated butterfly valve comprising, in general, a valve housing A, a butterfly assembly B mounted in the housing A for rotation between a closed position as shown in Fig. 4, wherein the butterfly is disposed in a plane normal to the major flow axis of the housing A and an open position, indicated in broken lines, wherein the butterfly is disposed in a plane of the flow axis.

The invention provides improved valve seat mechanism C for sealing the butterfly B to the housing A in its closed position. Improved bearing and seal assemblies D and D' are provided for fluid sealing the respective ends of the tubular shaft of butterfly assembly B, hereinafter more specifically described. A fluid type servomotor F is provided for actuating the butterfly B through gearing E. Switch mechanism G is provided for limiting the movement of butterfly B and indicating its respective limit positions (the open and closed positions referred to above). These several units of the apparatus will now be described in detail in the order listed above.

The valve housing A

Valve housing A is constructed in two sections, including a downstream section 11 having an axially projecting lip 12 defining a valve throat of Venturi form, and including a bolting flange 13; and an upstream housing section 14 of cylindrical tubular form having at one end a bolting flange 15 and at its other end a socket 16 of cylindrical cup shape adapted to receive the externally cylindrical body of housing section 11 with a piloting action which accurately locates the two housing sections in coaxial assembly, the section 11 being secured to the socket 16 by cap screws 17 extended through openings in bolting flange 13 and threaded into the cylindrical rim portion of socket 16.

Socket 16 has a radial web portion extending inwardly from the said rim portion thereof and joining the latter to the cylindrical housing section 14. This web portion, and the rear end of housing section 11, are provided with radial gasket-clamping faces, and the lip 12 extends into the upstream end of housing section 14, as hereinafter described. The housing section 14 includes a pair of bearing mounting bosses 18 of cylindrical tubular form, disposed at diametrically opposite positions with respect to the flow axis (the common axis of housing sections 11 and 14). The bosses 18 are disposed upon a common axis which is the axis of rotation of butterfly B, this axis being coincident with a diameter of said flow axis. At the butterfly axis, the valve housing section 14 has an internal annular concave butterfly chamber 19 defined by internal faces which converge from maximum diameter at the butterfly axis to the minimum diameters of lip 12 and housing section 14 respectively, where they intersect the inlet portion 14' of the valve chamber and the discharge portion 11' of the Venturi throat, respectively. These respective faces of the butterfly chamber 19 may jointly constitute a single concave surface of spherically zonal form, or may be frusto conical, approximating the spherical zone contour.

The flanges 13 and 15 are provided with bolt openings 20 (Fig. 2), for the reception of bolts for bolting the housing to flanges of spaced sections of any fluid conduit in which the valve may be installed.

The butterfly assembly B

Within the butterfly chamber 19, the disc 21 of butterfly assembly B is mounted for rotation on the butterfly axis with its periphery just clearing the wall of chamber 19. The disc 21 is disposed in an eccentric position with reference to the butterfly axis, having at its rear side a hub 22 (Figs. 4a and 9) which is channeled (Fig. 4a) to snugly receive a butterfly shaft 23 of square cross section externally and tubular to provide a pressure equalization passage 24 extending therethrough from end to end. A cap 25, secured to hub 22 by cap screws 26, securely clamps the disc 21 to the shaft 23.

At its ends, shaft 23 has cylindrical trunnions 27, 27' and shoulder flanges 28 at the junctions between the trunnions and the square central portion of the shaft.

Butterfly disc 21 has a seating rim 29 contoured as a zone of a sphere and describing a spherical surface (indicated at 30) as the valve is rotated between open and closed positions. Numeral 30 also indicates the open position of disc 21.

Valve seat mechanism C

Clamped between the adjacent flat radial faces of housing sections 11 and 14 is a washer-gasket 31 (Fig. 9) constituting an integral flat peripheral flange of a seal ring having a frusto conical intermediate portion 32 and a frusto conical valve seat collar 33 against which the spherical rim 29 of butterfly disc 21 is adapted to snugly seat. Intermediate portion 32 of the seal ring is engaged between a frusto conical internal annular face of the radial web portion of housing section 11 and a conforming frusto-conical external face of lip 12. The valve seat collar 33 is adapted to be seated against a frusto conical internal annular supporting surface of housing section 14 immediately upstream from the surface of housing section 11 which engages intermediate ring portion 32 and forming substantially a continuation of the frusto-conical Venturi throat surface of lip 12. The valve seat collar 33 however is not attached to its supporting surface, and is not compressed by the butterfly rim 29. Accordingly, an annular crevice will exist between the collar 33 and the supporting surface, and fluid pressure existing in the upstream valve chamber 14' will energize the sealing valve seat collar 33 to press it tightly against the butterfly rim 29 so as to establish a tight seal when the valve is closed. This seal, however, is of a sufficiently yielding nature so that the valve can be moved to its open position, with its rim 29 sliding against the collar 33 without tearing or stretching or otherwise damaging the same. In this connection, the proportions of the collar 33 and its characteristics of stiffness versus flexibility are such that it will retain its shape during the sliding contact of valve rim 29 thereagainst during opening and closing movements. As the material for the valve seat seal, the invention utilizes a synthetic resin plastic material of the class including nylon, Teflon, and Kel-F materials, the latter being preferred. The selected material is characterized by extremely high resistance to wear, extremely high toughness and resistance to tearing, and moderate flexibility throughout a large range of temperatures, sufficient to fully implement the pressure energized seating of the sealing part 33 against the valve rim 29 combined with sufficient form-retaining firmness to resist distortion under the frictional drag of the valve rim 29 against it during valve closing and opening movements. The technical nomenclature for the three materials mentioned are:

Nylon—Polymeric amide
Teflon—Tetrafluoroethylene
Kel–F—Teflon coating on a selected base resin

Bearing assemblies D and D'.

Bearing assembly D comprises a bushing 35 closed by an integral end cap 36 which terminates in a flange sealed to the end of boss 18 by a gasket 37. Bearing assembly D' comprises a cylindrical collar 35' formed integrally on the bottom of a gear housing hereinafter described, and encircling and supporting a bushing 38. Trunnions 27, 27' are journalled in the bushings 35 and 38 respectively, which in turn are mounted in sockets defined within bosses 18.

Referring now to Figs. 5 and 5a, the inner ends of bushings 35 and 38 are counterbored at 34. They are sealed to the respective bosses 18 by fluid pressure energized seals each comprising a flat circular washer gasket 39 of a material equivalent to those specified above, the gasket 39 being seated against an internal annular supporting flange 40 in housing section 14 at the base of a respective boss 18. Gasket 39 extends radially inwardly into an undercut annular groove 41 providing a smooth curved surface joining shaft flange 28 to the shaft surface. The outer marginal portions of the respective gaskets 39 are clamped against their respective supporting shoulders 40 by the respective ends of the parts 35 and 35'. Defined between these parts and the respective ends are annular fluid pressure chambers 43 in which pressure fluid seeping past the bushings will be applied to the radially inward areas of the respective gaskets 39 to seat them tightly against the respective shaft flanges 28. To increase the effectiveness of the pressure energized shaft seals thus provided, the flanges 28 are preferably formed with rigid annular seats 44, defined between oppositely sloping frusto conical faces on the outer sides of the respective flanges 28.

Spring loading of the gaskets 39 against seats 44, to maintain positive sealing for all conditions, is provided for by respective sets of Belleville spring washers 42 engaged under compression between shaft flanges 28 and bushings 35, 38 in counterbores 34.

Actuator pressure is applied to the gear chamber defined within the casing of gearing F. Through the hollow shaft 23, pressure is supplied at both ends of the shaft, eliminating unbalance, and loading both of the shaft seals equally. It is arrested at the shaft seals so as to be isolated from the valve chamber 11', 14'.

Gearing E

Collar 35' of bearing assembly D' is formed integrally as an extension of the bottom of a gear casing 45 which is secured by cap screws 46 to the boss 18 in which collar 35' is socketed. A cover plate 47 is detachably secured by cap screws 48 to the rim of gear casing 45. Secured by a pin 49 to the end of trunnion 27' is a gear segment 50 which meshes with rack teeth 51 in one side of a piston rod 52. Pin 49 is engaged in an open-end slot in shaft 23 and provides a readily releasable drive coupling between shaft and gear segment. A bearing roller 53, mounted on a stub shaft 54, supports the piston rod 52 at a point opposite the axis of gear segment 50, by rolling bearing engagement against a flattened bearing surface on the back side of piston rod 52. Linear movement of piston rod 52, transmitted from actuator mechanism F, is imparted through gear segment 50 to the shaft 23, for rotating the butterfly disc 21 between its limit positions.

Stub shaft 54 has its respective ends mounted in respective bosses formed integrally in the gear housing 45 and the cover 47, in coaxial alignment.

The gear chamber defined between housing 45 and cover 47 is hydraulically sealed by a gasket 55 (Fig. 6) which is interposed between a rim flange on cover 47 and a shallow counterbore in the end of casing 45. Thus the hydraulic pressure which is transmitted to the gear chamber from the hydraulic actuator cylinders as hereinafter more fully described, will be applied through the hollow shaft 23 to the bearing cap 36 and thereby will be applied equally to both ends of the shaft so that the shaft will not be subjected to end pressure in either direction.

The limit positions of the butterfly are determined by engagement of an actuator pin 72 on gear segment 50 against the limit switches of switch unit D, hereinafter described more in detail. This eliminates the necessity for positive stop mechanism.

Actuator mechanism F

Actuator F comprises a pair of cylinders 56 which have base flanges secured by cap screws 57 to gear housing 45 at the open ends of coaxial bores 58 arranged on opposite sides of the median plane of the gear housing (normal to the axis of piston rod 52, and containing the butterfly axis). Each cylinder 56 is provided at its inner end with a cylindrical pilot 59 which telescopes into a respective bore 58 to locate the cylinders coaxially. The respective cylinders are sealed to the open ends of housing 45 by respective gaskets 60 (Fig. 3) which are engaged between integral base flanges on the inner ends of the cylinders and shallow counterbores in the respective ends of the housing 45.

At their outer ends, the cylinders 56 are provided with respective actuator ports 61 which, in the apparatus as utilized in a hydraulic system, will be connected to respective hydraulic fluid feed lines coming from a two-way valve selectively operable to supply fluid under pressure to either one of the cylinders 56 while draining the other cylinder. Such arrangements are common in the hydraulic art and the parts just referred to are therefore not disclosed in the drawing.

Within each cylinder is a respective piston 62 having a counterbore receiving a respective cylindrical end portion of piston rod 52 and secured thereto by a bolt 63 extending through the piston and threaded into a threaded bore in the respective end of the piston rod. The hydraulic pressure applied to a respective piston will act thereon to shift it to the inner end of its respective cylinder while the opposite piston is returned to a position at the outer end of its cylinder (as shown at the left end of Fig. 3). When a piston has reached its inner limit of stroke, a small portion of the hydraulic fluid will be allowed to seep past the piston into the gear chamber of gearing E and will equalize the pressures at the respective ends of butterfly shaft 23 through the equalization passage 24 as hereinafter described. Referring now to Figs. 7 and 8, each piston is sealed to its respective piston rod by a gasket 64 encircling a respective bolt 63 and engaged under compression between the respective end of the piston rod 52 and an annular web 65 in the respective piston at the bottom of its respective counterbore. Each piston is provided with a pair of unidirectional seals comprising spring metal piston rings 66 received in respective ring grooves 67 in the piston and each spring loaded to the outer side of its respective groove by a marcel washer spring 68 engaged under compression between the inner side of the respective ring and the inner side of the respective groove. Fluid under pressure will seep past a piston that is subjected to fluid pressure at its actuator port 61, in the inward direction indicated by the arrow 69 in Fig. 7, so as to enter the gear chamber, pressurizing this chamber to a pressure substantially equalized with the pressure at the actuator port. Such pressure will be applied to the opposite piston (which is unpressurized at its outer side) thus assisting the action of pressure against the pressurized piston in moving the piston rod 52 in the selected direction. The pressure acting against the inner side of the unpressurized piston will not be permitted to escape past that piston to the unpressurized port, since it will be acting in the same direction as the loading springs 68 of the unpressurized piston, and the latter will thereby be fluid sealed to its cylinder. The inward seepage of pressure past the rings of the pressurized piston will result from the inward yielding (toward the center of the gear chamber) of the piston rings 66 in response to the fluid pressure, overcoming the yielding resistance of loading springs 68, permitting the pressure fluid to flow radially inwardly past the respective piston rings into their respective grooves 67 and thence past the inner peripheries of the respective rings and thence outwardly through the respective marcelled washers 68 to the clearance space between the piston body and the respective cylinder wall.

Limit switch mechanism G

Mounted on the inner face of gear housing cover 47 (Fig. 10) are a pair of micro-switches 70 having respective actuator fingers 71, 71' which may be in the form of spring arms arranged, when depressed, to transmit movement to the respective actuator buttons of the respective micro-switches. The actuator fingers 71, 71' are positioned radially with respect to the butterfly axis at the center of gear housing 45, where they will be alternatively engaged by an actuator pin 72 projecting from the outer face of gear segment 50. In the position of the pin shown in Fig. 3, it will engage the actuator finger 71. From this position, as the actuator is operated to its other limit, the pin 72 will move clockwise as viewed in Fig. 3 in the path indicated by broken lines 72' until it engages and depresses the actuator finger 71'. It may be noted that Fig. 10 views the outer side of the cover 47 with portions thereof broken away to show the respective microswitch units 70 in full lines, looking in the same direction as in Fig. 3.

The respective contacts of the switches 70 are connected to a common ground terminal 73 and to respective "live" terminals 74 and 74' by respective conductor wires 75, 76 and 76' respectively. These terminals may in turn be connected to respective indicator lights (not shown) for indicating the respective valve closed and valve open limit positions of the butterfly, in which case, the switches 70 may be normally open switches, closed when actuated by its respective actuator finger 71 (or 71') and thereby causing the indicator light for the opposite position to be extinguished.

Limits of actuator movement are determined by contact of bolts 63 with the opposed ends of the respective cylinders.

For operating the actuator, an inert gas which remains gaseous at low temperatures (such as the temperatures encountered in handling liquid oxygen in the fueling of missiles) is employed. A suitable gas is nitrogen, although other gases having equivalent characteristics (e.g. at the low end of the scale of elements) such as helium, may be used.

I claim:

1. In a butterfly valve: a tubular valve housing defining a flow passage having a valve seat throat therein; a butterfly; bearings in which said butterfly is mounted in said housing adjacent said valve seat throat for rotation on a fixed axis; an actuator powered by dry gas under pressure; means for transmitting movement thereof to rotate said butterfly; means providing substantially fluid-tight enclosures for said transmitting means and for said bearings; and means providing for leakage of said dry gas by the transmitting means to said bearings, whereby said enclosures are pressurized by said dry gas leaking from said actuator so as to prevent entry of moisture into said enclosures.

2. A valve as defined in claim 1, including a shaft carrying said butterfly, said shaft being tubular so as to equalize the fluid pressures at the respective bearings.

3. In a butterfly valve: a tubular valve housing defining a flow passage including a valve seat throat; a valve seat in said throat; a butterfly disc having a rim adapted to seat on said valve seat to close said throat; a tubular shaft carrying said butterfly disc; bearings in which the ends of said tubular shaft are journalled for rotation of said butterfly disc to open and close said valve; a pressurized dry gas energized actuator; means for transmitting movement thereof to one end of said butterfly shaft to rotate said butterfly disc; means providing a fluid-tight chamber enclosing said transmitting means; and means providing for leakage of dry gas in one direction by said actuator, whereby said chamber will receive pressurized dry gas leaking by said actuator, one of said bearings being in communication with said chamber and pressurized therefrom and said tubular shaft conveying pressurized dry gas from said chamber to the other bearing and equalizing the gas pressure at both ends of the shaft, the dry gas pressure in said chamber and bearings preventing the entry of moisture thereinto.

4. A valve as defined in claim 3, wherein each of said bearing means comprises a bushing in which a respective end of said shaft is journalled, a radial shoulder flange on the respective shaft end, having a gasket seat in axially-spaced opposed relation to the inner end of said bushing, means in said housing providing a socket receiving said bushing and including an integral radial gasket-supporting flange defining the inward extremity of said socket, said supporting flange encircling said shoulder flange and disposed in a common plane therewith, a gasket of washer form having an inner portion interposed between the inner end of said bushing and said gasket seat and an outer portion seated on said supporting flange, and means associated with said bushing and bearing against said outer gasket portion to clamp said gasket to said supporting flange and seal it to said housing, said inner gasket portion being effective, in response to fluid pressure thereon, to establish fluid-tight seating engagement with said gasket seat.

5. In a butterfly valve: a tubular valve housing defining a flow passage including a valve seat throat; a valve seat in said throat; a butterfly element having a rim adapted to seat on said valve seat to close said throat; a tubular shaft carrying said butterfly element; fluid pressure actuated means for transmitting movement thereof to one end of said butterfly shaft to rotate said butterfly element; casing means providing a fluid-tight chamber enclosing said last means; means providing for leakage of pressure fluid by said fluid pressure actuated means into said tubular shaft; means sealed to said housing and providing a fluid-tight cap over the other end of said shaft; and bearing means in which the ends of said tubular shaft are journalled for rotation of said butterfly element on an axis which is a diameter of the axis of said passage and throat, with said rim describing a surface to which said seat is tangent, each of said bearing means comprising a bushing in which a respective end of said shaft is journalled, a radial shoulder flange on said respective shaft end, having a gasket seat in axially-spaced opposed relation to the inner end of said bushing, means in said housing, defining a socket receiving said bushing and including an integral radial gasket-supporting flange defining the inward extremity of said socket, said supporting flange encircling said shoulder flange and disposed in a common plane therewith, a gasket of washer form having an inner portion interposed between the inner end of said bushing and said gasket seat and an outer portion seated on said supporting flange, and an annular sealing lip associated with said bushing and bearing against said outer gasket portion to clamp said gasket to said supporting flange and seal it to said housing, said inner gasket portion being effective, in response to fluid pressure seeping between the respective shaft end and said bushing, to seat against the respective shoulder flange and thereby seal the respective shaft end to the housing to isolate said flow passage and throat from actuator fluid pressure, said shaft being open at both ends to equalize pressures upon the bearing means at the respective ends of the shaft.

6. In a butterfly valve: a tubular valve housing defining a flow passage including a circular valve seat throat; a valve seat in said throat; a circular butterfly valve element disc having a rim adapted to seat on said valve seat to close said throat; a tubular shaft carrying said butterfly valve element disc; fluid pressure actuated means for transmitting movement thereof to one end of said butterfly shaft to rotate said butterfly element; casing means providing a fluid-tight chamber enclosing said last means; means providing for leakage of pressure fluid by said fluid pressure actuated means into said tubular shaft; means sealed to said housing and providing a fluid-tight cap over the other end of said shaft; and bearing means in which the ends of said tubular shaft are journalled for rotation of said butterfly valve element disc on an axis which is a diameter of the axis of said passage and throat, with said rim describing a spherical surface to a zonal portion of which said seat is substantially conformed, each of said bearing means comprising a bushing in which a respective end of said shaft is journalled, a radial shoulder flange on said respective shaft end, having a gasket seat in axially-spaced opposed relation to the inner end of said bushing, means in said housing mounting said bushing; a gasket of washer form having an inner portion interposed between the inner end of said bushing and said gasket seat and an outer portion secured and sealed to said housing, said inner gasket portion being effective, in response to fluid pressure seeping between the respective shaft end and said bushing, to seat against the respective shoulder flange and thereby seal the respective shaft end to the housing to isolate said flow passage and throat from actuator fluid pressure, said shaft being open at both ends to equalize pressures upon the bearing means at the respective ends of the shaft.

7. In a butterfly valve: a tubular valve housing defining a circular valve seat throat and a flow passage and comprising two coaxial annular housing sections and a joint connecting them at approximately the plane of said throat, and a valve seat collar having an integral gasket of washer form clamped between opposed end faces of said housing sections and sealing said joint; a circular butterfly disc having a seating rim of spherical-zonal shape mounted in said housing for rotation on a fixed axis which is a diameter of said passage and throat, with said rim describing a spherical surface to a zonal portion of which the internal surface of said collar is substantially conformed, said valve seat collar extending upstream from said joint adjacent the wall of said throat and separated therefrom by an annular crevice into which fluid under pressure in the upstream side of said housing may enter to yieldingly load said valve seat collar into fluid-tight seating engagement with said butterfly valve element disc rim; a tubular shaft carrying said butterfly disc; fluid pressure actuated means for transmitting movement thereof to one end of said butterfly shaft to rotate said butterfly disc; casing means providing a fluid-tight chamber enclosing said last means, means providing for leakage of pressure fluid by said fluid pressure actuated means into said tubular shaft; means sealed to said housing and providing a fluid-tight cap over the other end of said shaft; and bearing means in which the ends of said tubular shaft are journalled for rotation of said butterfly disc on an axis which is a diameter of the axis of said passage and throat, with said rim describing a spherical surface to a zonal portion of which said seat is substantially conformed, each of said bearing means comprising a bushing in which a respective end of said shaft is journalled, a radial shoulder flange on said respective shaft end having a gasket seat in axially-spaced opposed relation to the inner end of said bushing, a boss in said housing, having a socket receiving said bushing and including an integral radial gasket-supporting flange defining the inward extremity of said socket, said supporting flange encircling said shoulder flange and disposed in a common plane therewith, a gasket of washer form having an inner portion interposed between the inner end of said bushing and said gasket seat and an outer portion seated on said supporting flange, and an annular sealing lip associated with said bushing and bearing against said outer gasket portion to clamp said gasket to said supporting flange and seal it to said housing, said inner gasket portion being effective, in response to fluid pressure seeping between the respective shaft end and said bushing, to seat against the respective shoulder flange and thereby seal the respective shaft end to the housing to isolate said flow passage and throat from actuator fluid pressure, said shaft being open at both ends to equalize pressures upon the bearing means at the respective ends of the shaft.

8. In a butterfly valve: a tubular valve housing defining a flow passage including a valve seat throat; a butterfly disc having a rim adapted to seat to said throat to close the same; a tubular shaft carrying said butterfly disc; bearing means in which the respective ends of said tubular shaft are journalled for rotation of said butterfly disc between open and closed positions; casing means providing substantially fluid tight enclosures around the respective bearing means; and means for subjecting one of said enclosures to a pressurized dry gas, said tubular shaft transmitting the pressurized gas to the other of said bearing means whereby to prevent entry of moisture into said bearing means.

9. A butterfly valve as defined in claim 8, wherein each of said bearing means comprises a bushing in which a respective end of said shaft is journalled, a radial shoulder flange on the respective shaft end, having a gasket seat in axially spaced opposed relation to the inner end of said bushing, a gasket of washer form having an inner portion interposed between the inner end of said bushing and said gasket seat and contacting the latter and having an outer portion secured and sealed to said casing means, said inner gasket portion being effective, in response to fluid pressure in the respective bearing means, to seat against the respective shoulder flange and thereby seal the respective shaft end to the housing to isolate said flow passage and throat from the pressure in said bearing enclosures.

10. A butterfly valve as defined in claim 9, including Belleville spring washers engaged under compression between the inner ends of the respective bushings and the respective gaskets to provide constant positive sealing of the respective bearing means and to provide constant yielding end-loading of the shaft for centering said butterfly disc with reference to said valve throat.

11. In a butterfly valve: a tubular valve housing defining a valve seat throat and a flow passage; a butterfly valve element adjacent said seat throat; a tubular shaft carrying said valve element; bearings in which the respective ends of said shaft are mounted in said housing for rotation on a fixed axis; a pressurized dry gas powered actuator including a gear casing secured to said housing and providing a substantially fluid tight chamber communicating with one of said bearings, a pair of coaxial cylinders mounted on the respective ends of said gear casing and communicating with said chamber at their inner ends, pistons in the respective cylinders, a piston rod connecting said pistons, and means for admitting pressurized dry gas to the remote ends of said cylinders to apply pressure to the outer ends of said pistons for operating said actuator, said pistons being provided with unidirectional ring seals permitting inward bleed of the pressurized gas from the said remote ends of the cylinders past the pistons and into said gear casing to pressurize the latter and the bearing communicating therewith, said tubular shaft conveying the pressurized gas to the other bearing to pressurize the latter and equalize the fluid pressure at both ends of the shaft; and means in said gear casing for transmitting movement from said piston rod to said shaft to rotate the latter comprising rack teeth on said piston rod and a gear segment on said shaft.

12. A valve as defined in claim 11, including fluid pressure responsive seals in the respective bearing in the inner ends thereof for sealing the same from said flow chamber, said sealing means effecting their sealing action in response to a differential of actuator pressure in said gear casing chamber over the pressure in said flow passage and being effective to isolate the fluids in said bearings and flow chamber from one another.

13. In a butterfly valve: a tubular valve housing defining a flow passage including a circular valve seat throat; a valve seat in said throat; a circular butterfly having a rim adapted to seat on said valve seat to close said throat; a tubular shaft carrying said butterfly; fluid pressure actuated means for transmitting movement thereof to one end of said butterfly shaft to rotate said butterfly; casing means providing a fluid-tight chamber enclosing said last means; means providing for leakage of pressure fluid by said fluid pressure actuated means into said tubular shaft; means sealed to said housing and providing a fluid-tight cap over the other end of said shaft; and bearing means in which the ends of said tubular shaft are journalled for rotation of said butterfly on an axis which is a diameter of the axis of said passage and throat, with said rim describing a spherical surface to a zonal portion of which said seat is substantially conformed, each of said bearing means comprising a bushing in which a respective end of said shaft is journalled, a radial shoulder flange on said respective shaft end having a gasket seat in axially-spaced opposed relation to the inner end of said bushing, means in said housing providing a socket receiving said bushing and including an integral radial gasket-supporting flange defining the inward extremity of said socket, said supporting flange encircling said shoulder flange and disposed in a common plane therewith, a gasket of washer form having an inner portion interposed between the inner end of said bushing and said gasket seat and an outer portion seated on said supporting flange, and an annular sealing lip associated with said bushing and bearing against said outer gasket portion to clamp said gasket to said supporting flange and seal it to said housing, said inner gasket portion being effective, in response to fluid pressure seeping between the respective shaft end and said bushing, to seat against the respective shoulder flange and thereby seal the respective shaft end to the housing to isolate said flow passage and throat from actuator fluid pressure, said shaft being open at both ends to equalize pressures upon the bearing means at the respective ends of the shaft.

14. In a butterfly valve: a tubular valve housing defining a circular valve seat throat and a flow passage and comprising two coaxial annular housing sections and a joint connecting them at approximately the plane of said throat; a valve seat collar having an integral gasket of washer form clamped between opposed end faces of said housing sections and sealing said joint; and a butterfly disc having a seating rim of substantially spherical-zonal shape mounted in said housing for rotation on a fixed axis which is a diameter of said passage, with said rim describing a spherical surface a zonal portion of which is substantially conformed to the internal surface of said collar; said valve seat collar extending upstream from said joint adjacent the wall of said throat and in substantially conformed relation thereto but separated therefrom by an annular crevice into which fluid under pressure in the upstream side of said housing may enter to yieldingly load said valve seat collar into fluid-tight seating engagement with said butterfly disc rim; one of said housing sections constituting a housing body defining the major portion of said flow passage, having a counterbore at said joint, and having diametrically opposed bearing means in which said butterfly disc is mounted for rotation, said other housing section defining a venturi throat, said other housing section having a shoulder portion piloted in said counterbore and providing a flat end shoulder bearing against said gasket, and having an annular lip of tapered axial section telescoped into said body section and cooperating therewith to support said valve seat collar.

15. A butterfly valve as defined in claim 14, wherein said valve seat collar is of a synthetic resin material having flexibility, toughness and wear resistance characteristics generally equivalent to those of polymeric amide and tetrafluoroethylene resins.

16. In a butterfly valve for the handling of gases: a tubular valve housing defining a circular valve seat throat and a flow passage and comprising two coaxial annular housing sections and a joint connecting them at approximately the plane of said throat; a seal ring of synthetic resin having flexibility, toughness and wear resistance characteristics generally equivalent to those of polymeric amide and tetrafluoroethylene resins, said seal ring comprising a gasket of washer form clamped between opposed end faces of said housing sections and sealing said joint and a valve seat collar consisting in a circumferentially continuous integral free end portion of said seal ring; and a butterfly disc having a seating rim of spherical-zonal shape mounted in said housing for rotation on a fixed axis which is a diameter of said passage, with said rim describing a spherical surface a zonal portion of which is substantially conformed to the internal surface of said collar; said valve seat collar extending upstream from said joint adjacent the wall of said throat and in substantially conformed relation thereto so as to be supported thereby during movement of said disc, but separated therefrom by an annular crevice into which fluid under pressure in the upstream side of said housing may enter to yieldingly load said valve seat collar into fluid-tight seating engagement with said butterfly disc rim, one of said housing sections being a downstream section having an annular lip projecting beyond said opposed end faces in overlapping, radially spaced relation to the other of said housing sections and defining a portion of an upstream-flaring wall of said throat, said seal ring including an intermediate tubular web portion connecting said gasket and said valve seat collar and disposed between said lip and the other housing section, said other housing section having an upstream-flaring generally frusto conical wall providing a supporting seat for said valve seat collar.

References Cited in the file of this patent

UNITED STATES PATENTS

| | | |
|---|---|---|
| 1,383,482 | Popp | July 5, 1921 |
| 1,572,922 | Govers | Feb. 16, 1926 |
| 2,059,656 | Ring | Nov. 3, 1936 |
| 2,081,842 | Sharp | May 25, 1937 |
| 2,617,638 | Udale | Nov. 11, 1952 |
| 2,698,731 | Koehler | Jan. 4, 1955 |
| 2,890,856 | Clade | June 16, 1959 |
| 2,929,406 | Anderson | Mar. 22, 1960 |